US007788815B2

(12) United States Patent
Yandrick et al.

(10) Patent No.: US 7,788,815 B2
(45) **Date of Patent: *Sep. 7, 2010**

(54) PRISM POLE WITH DIRECT READOUT

(75) Inventors: Richard Yandrick, Sellersville, PA (US); Edward Wilkinson, Spring City, PA (US); John Wilkinson, Phoenixville, PA (US)

(73) Assignee: Wilkinson & Associates, Valley Forge, PA (US)

(*) Notice: Subject to any disclaimer, the term of this patent is extended or adjusted under 35 U.S.C. 154(b) by 344 days.

This patent is subject to a terminal disclaimer.

(21) Appl. No.: 11/890,792

(22) Filed: Aug. 6, 2007

(65) Prior Publication Data

US 2008/0256812 A1 Oct. 23, 2008

Related U.S. Application Data

(63) Continuation-in-part of application No. 11/335,187, filed on Jan. 18, 2006, now Pat. No. 7,251,899.

(60) Provisional application No. 60/644,709, filed on Jan. 18, 2005.

(51) Int. Cl.
*G01C 15/06* (2006.01)

(52) U.S. Cl. ........................................................ 33/294

(58) Field of Classification Search ................... 33/294, 33/293, 295, 296, 809–812, 706, 707
See application file for complete search history.

(56) References Cited

U.S. PATENT DOCUMENTS

| | | | | |
|---|---|---|---|---|
| 4,029,415 | A | | 6/1977 | Johnson |
| 4,653,910 | A | | 3/1987 | Poling |
| 4,899,452 | A | * | 2/1990 | Schafer ....................... 33/296 |
| 4,993,160 | A | | 2/1991 | Fraley |
| 5,070,620 | A | | 12/1991 | Crain et al. |
| 5,402,223 | A | * | 3/1995 | Schlobohm et al. ........... 33/294 |
| 5,457,890 | A | | 10/1995 | Mooty |
| 5,551,159 | A | | 9/1996 | Mooty |
| 5,894,344 | A | | 4/1999 | Tamez et al. |
| 5,915,810 | A | | 6/1999 | Cameron |
| 5,957,717 | A | | 9/1999 | Monsef et al. |

(Continued)

*Primary Examiner*—Christopher W Fulton
(74) *Attorney, Agent, or Firm*—Fox Rothschild LLP; Charles N. Quinn

(57) ABSTRACT

A prism pole has a tubular housing having an open top, a flange at the open top, a bottom portion for contacting ground soil, a height-adjustable rod insertable into the tubular housing with an outer diameter less than inner diameter of the tubular housing to provide a slidable friction fit therebetween for positioning the height-adjustable rod with respect to the tubular housing, a lip at the top of the rod, a laser sensor mounted on the tubular housing for emitting a laser toward the lip to measure distance between the laser sensor and the lip, an electronic control unit in electrical communication with the laser sensor for receiving height measurements and providing height reference data corresponding to the height measurements, an electronic display in electrical communication with the electronic control unit for receiving the height reference data and displaying the height reference data, an audio device in electrical communication with the electronic control unit for emitting an alarm in response to receipt of a signal from the electronic control unit indicating movement of the height-adjustable rod with respect to the tubular housing, and an output device in electrical communication with the electronic control unit for sending the height reference data to a data collection device.

20 Claims, 5 Drawing Sheets

U.S. PATENT DOCUMENTS

| | | | |
|---|---|---|---|
| 5,983,511 A | 11/1999 | Osaragi et al. | |
| 6,076,267 A | 6/2000 | Gotoh | |
| 6,085,434 A | 7/2000 | Mitchell | |
| 6,166,802 A | 12/2000 | Kodaira et al. | |
| 6,209,210 B1 | 4/2001 | Stout | |
| 6,266,143 B1 | 7/2001 | Peterson et al. | |
| 6,295,174 B1 | 9/2001 | Ishinabe et al. | |
| 6,425,186 B1 | 7/2002 | Oliver | |
| 6,487,781 B2 | 12/2002 | Johnson | |
| 6,502,321 B1 | 1/2003 | Crain et al. | |
| 6,508,006 B1 | 1/2003 | Black | |
| 6,573,981 B2 | 6/2003 | Kumagai et al. | |
| 6,584,697 B1 | 7/2003 | Guoan et al. | |
| 6,588,868 B1 | 7/2003 | Skultety-Betz | |
| 6,622,392 B1 | 9/2003 | Bourget | |
| 6,657,734 B1 | 12/2003 | Monz et al. | |
| 6,658,751 B2 | 12/2003 | Jackson et al. | |
| 6,662,458 B1 | 12/2003 | Antonelli | |
| 6,688,012 B1 | 2/2004 | Crain et al. | |
| 6,711,826 B2 | 3/2004 | Crain et al. | |
| 6,760,974 B1 | 7/2004 | Jorgenson | |
| 6,772,526 B1 | 8/2004 | Crain et al. | |
| 6,796,043 B2 | 9/2004 | Jackson et al. | |
| 6,820,343 B2 | 11/2004 | Waibel et al. | |
| 6,834,839 B1 | 12/2004 | Wilson | |
| 7,251,899 B2 * | 8/2007 | Yandrick et al. | 33/294 |
| 7,266,898 B2 * | 9/2007 | El-Katcha et al. | 33/293 |
| 7,373,725 B1 * | 5/2008 | Vanneman et al. | 33/293 |
| 7,506,452 B1 * | 3/2009 | Vanneman et al. | 33/293 |

* cited by examiner

PRISM POLE WITH DIRECT READOUT

CROSS-REFERENCE TO RELATED PATENT APPLICATION

This patent application is a 35 USC 120 continuation-in-part of U.S. Pat. No. 7,251,899 issued 7 Aug. 2007, which claimed, as does this application, the benefit under 35 USC 119 of U.S. provisional patent application Ser. No. 60/644,709 entitled "Direct Reading Prism Pole", filed 18 Jan. 2005 in the names of Richard Yandrick, Edward Wilkinson and John Wilkinson.

BACKGROUND OF THE INVENTION

1. Field of Invention

The invention relates to a prism pole for supporting a reflective prism or other piece of passive or electrically or optically active equipment used principally in the course of surveying landforms, structures, etc, facilitating automatic taking of height measurements and providing height reference data corresponding therewith.

2. Description of Related Art

Prism poles are used in surveying to support a reflective prism or other piece of surveying equipment. Prior art prism poles, such as shown in FIG. 1, typically include a tubular housing and a height-adjustable rod that is telescopically partially resident therein. The height-adjustable rod slides inwardly and outwardly with respect to the tubular housing. Prior art prism poles typically include a numerical scale printed on the height-adjustable rod, typically marked in increments of hundredths (1/100) of a foot or thousandths (1/1000) of a meter. A reflective prism or other piece of surveying equipment attaches to the top of the height-adjustable rod. A light source or mirror may be at a remote location and serves to direct light at the prism. When the prism located on the top of the adjustable rod receives the light and divides the light according to the optical spectrum, the operator of the prism pole knows that the adjustable part of the prism pole (and the attached prism) is at a known height relative to the source of the light directed at the prism on the prism poles. A prism pole operator can manually read a height measurement from the numerical scale at a point along the height-adjustable rod. The operator typically then records the height measurement into a log book or manually enters the height measurement into a data collection device.

Prior art prism poles allow human error to interfere with accurate measurement-taking. For example, the height-adjustable rod of the prism pole may slowly slide down into the tubular housing, unbeknownst to the prism pole operator. Because the operator is unaware of the minor slippage, the operator errs in recording accurate height measurements.

Prior art prism poles are also problematic because operators often misread height measurements from the numerical scale. In addition, operators often fail to record changes in height measurements when the operator adjusts the position of the height-adjustable rod. Operators also make transposition errors when manually copying height measurements from the numerical scale into a log book or data collection device. A prism pole is needed that reduces the amount of human error that interferes with accurate measurement-taking.

SUMMARY OF THE INVENTION

The invention includes a direct reading prism pole having a height-adjustable rod and an encoded strip of optically-perceptible markings positioned longitudinally on the height-adjustable rod, together with internally or externally mounted optical laser, a string potentiometer or a rotary distance reader. The direct reading prism pole desirably includes a tubular housing. The height-adjustable rod is desirably partially inserted into the tubular housing and has an outer diameter just less than the inner diameter of the tubular housing, to create a telescopically movable, slidable frictional fit therebetween. The height-adjustable rod slides inwardly and outwardly with respect to the tubular housing, but may be mounted to remain at a fixed position due to the friction fit. The direct reading prism pole includes a lip at the top of the height-adjustable rod.

The direct reading prism pole preferably also includes an electronic control unit housing an optical or electronic reader for taking height measurements, which relate to the relative position of the rod within the housing, and for providing height reference data corresponding to the height measurements. As used herein, "height reference data" includes (1) data representative of one or more instantaneous height measurements ($h_n$), (2) data representative of one or more changes between height measurements ($\Delta h_{n,n+1}$), and/or (3) other related data.

The direct reading prism pole may also include an electronic display which may or may not be mounted on the pole, and is in electrical communication with the electronic control unit. The electronic display receives the height reference data defining the height measurement from the electronic control unit and desirably displays the height reference data on a screen. The direct reading prism pole may also include an audio device, such as a speaker, in electrical communication with the electronic control unit. The audio device desirably emits an alarm in response to receipt of a signal from the electronic control unit, indicating the height-adjustable rod has moved with respect to the tubular housing, since the collection and display of the measured height reference data may be inaccurate due to the movement of the rod. The direct reading prism pole desirably also includes an output device, such as a wireless transmitter or an output jack, in electrical communication with the electronic control unit. The output device sends height reference data from the electronic controller unit to a data collection device, such as an electronic field device or a remote computer system.

In another embodiment of the invention, the direct reading prism pole includes an electronic control unit having a wheel assembly. The wheel assembly includes a wheel rotatable about a central axis, with the perimeter of the wheel in frictional engagement with the height-adjustable rod. The frictional engagement allows the wheel to rotate about the central axis when the height-adjustable rod moves telescopically with respect to the tubular housing. The electronic control unit calculates a height using the previous (or default) height measurement and a change in height that is calculated from angular displacement of the wheel.

In another embodiment of the invention, the direct reading prism pole includes a laser in combination with an electronic control unit. The laser preferably mounts on either the inner or outer surface of the tubular housing and emits a laser beam towards the lip at the top of the height-adjustable rod. The electronic control unit calculates a height measurement using the distance measured between the point of laser beam emission and the lip together with a default distance corresponding to a fully extended position of the height-adjustable rod.

In yet another embodiment on the invention, the direct reading prism pole may include a string potentiometer mounted either internally or externally on the pole, in combination with an electronic control unit. The electronic unit calculates a height measurement using the distance measured using the string potentiometer, from the string potentiometer mounting point to a top connection point on the pole.

DESCRIPTION OF THE DRAWINGS

The accompanying drawings, which are incorporated in and form a part of this specification, illustrate the invention and, together with this description, set forth the best mode for practice of the invention as currently contemplated.

DETAILED DESCRIPTION OF THE INVENTION INCLUDING THE BEST MODE PRESENTLY CONTEMPLATED FOR PRACTICE THEREOF

Figure 1:
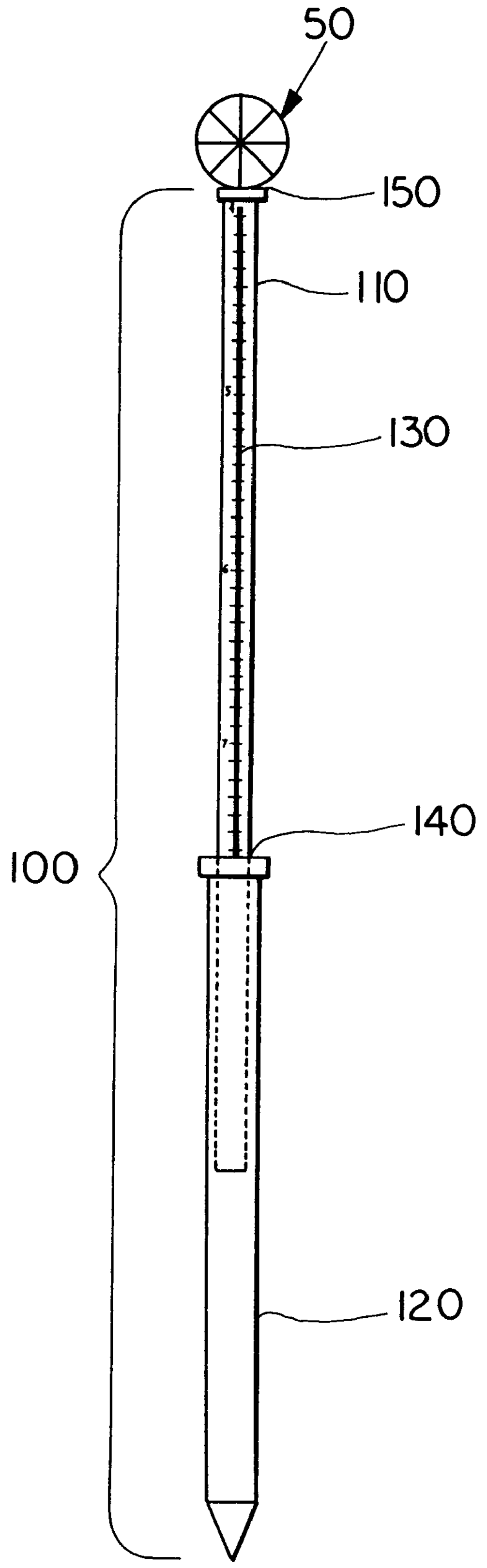
FIG. 1 is a front elevation of a reflective prism and a prism pole of the prior art.

Referring to FIG. 1, a prior art prism pole is shown and designated generally 100 with a reflective prism being shown and designated generally 50. Prism pole 100 includes a height-adjustable rod 110 telescopically resident within a tubular housing 120 and a numerical scale 130 imprinted on height-adjustable rod 110. Height-adjustable rod 110 is partially inserted inside tubular housing 120 with a friction fit therebetween. Numerical scale 130 is preferably printed on height-adjustable rod 110 and is preferably positioned to run longitudinally along height-adjustable rod 110. Tubular housing 120 has an open top for passage of height-adjustable rod 110 thereinto and a conical bottom portion for wedging tubular housing 120 into ground soil and the like for support.

Tubular housing 120 has a flange at the open top to delineate a reading point 140 where an operator of prism pole 100 can manually read a height measurement from numerical scale 130. The distance between reading point 140 and the top of height-adjustable rod 110 is preferably about seven (7) feet when height-adjustable rod 110 is fully extended with respect to tubular housing 120. Height-adjustable rod 110 preferably includes a lip 150 at the top of rod 110. Reflective prism 50 preferably attaches to prism pole 100 at lip 150.

Referring to FIGS. 2*a* through 2*d*, four prism poles embodying aspects of the invention are shown. Each one of these prism poles takes height measurements automatically and displays corresponding height reference data. Furthermore, each one includes an electronic control unit, an electronic display, an output device, and, optionally, an audio device. For purposes of illustration and without limiting the scope of the invention, each one of the four prism poles is shown and described to include different means for automatically obtaining the height measurements. Each one of the poles includes height-adjustable rod 110 and tubular housing 120. However, in each one of the poles, height-adjustable rod 110 and tubular housing may include minor modifications as is necessary and/or desired.

Figure 2A:
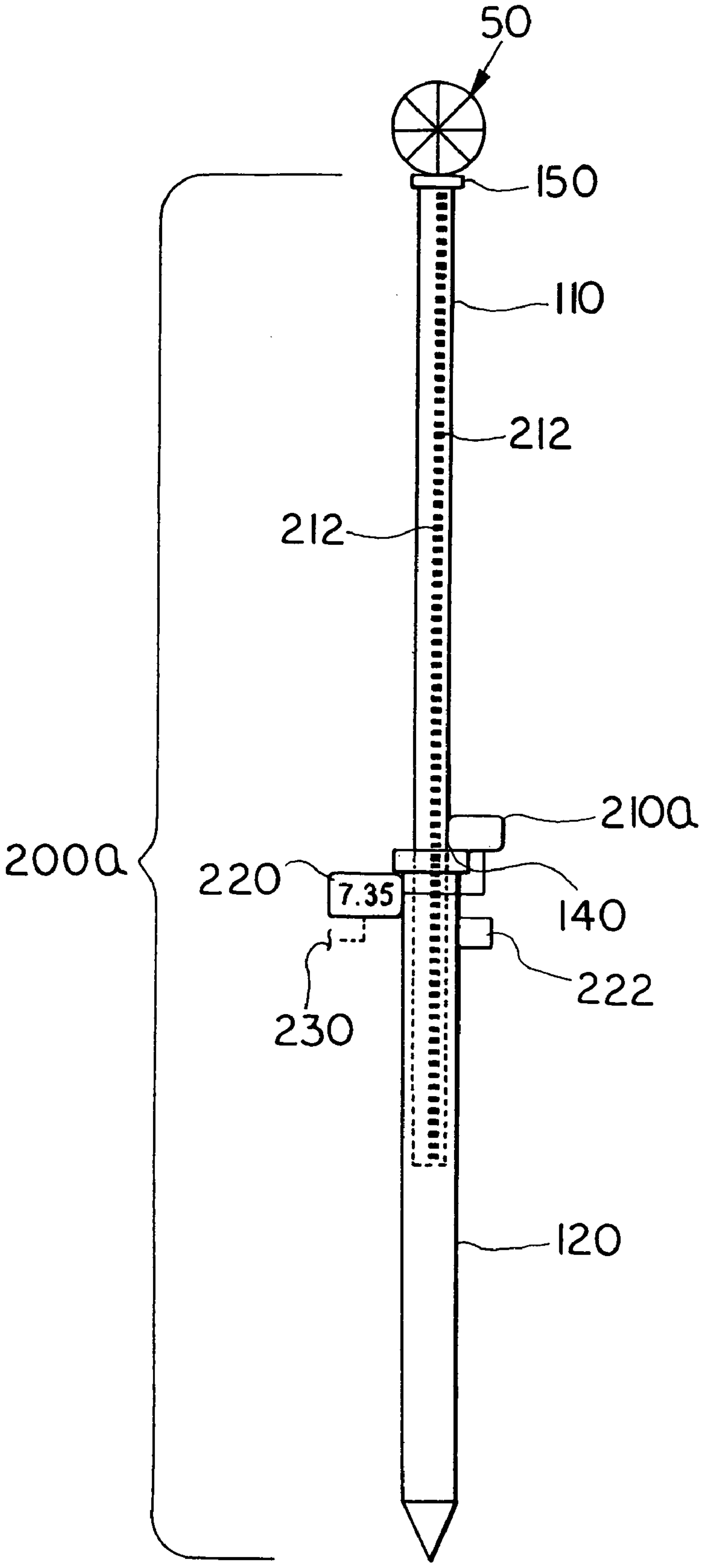
FIG. 2*a* is a front elevation in accordance with the invention of a reflective prism and a direct reading prism pole having an encoded strip and an electronic control unit with an optical reader. The portion of the encoded strip and height-adjustable rod inside the tubular housing are shown in dotted lines.

Referring to FIG. 2*a*, a first embodiment of the direct reading prism pole in accordance with the invention is designated generally 200*a*. An encoded strip 212 of optically-perceptible markings is positioned longitudinally and fixed on height-adjustable rod 110. Direct reading prism pole 200*a* includes an electronic control unit 210*a* having an integral optical reader as a part thereof, which reader is not numbered in the drawings, for reading the optically-perceptible markings on encoded strip 212. Electronic control unit 210*a* mounts to the flange of tubular housing 120 so the optical reader is positioned as closely as possible to the reading point 140 so that the reading taken by unit 210*a* is of the exposed optically perceptible marking that is closest to the upper edge of the unnumbered flange defining reading point 140.

The optical reader of electronic control unit 210*a* obtains height measurements by optically reading each optically-perceptible marking at reading point 140 as height-adjustable rod 110 moves with respect to tubular housing 120. Electronic control unit 210*a* electronically converts one or more of the optically read height measurements into electronically storable and transmittable height reference data. As discussed above, “height reference data” includes (1) data representative of one or more instantaneous height measurements ($h_n$), (2) data representative of one or more changes between height measurements ($\Delta h_{n,n+1}$), and/or (3) other related data. Electronic control unit 210*a* includes a microprocessor and a memory device.

Each optically-perceptible marking of encoded strip 212 represents height information that is “absolute” in the sense that each optically-perceptible marking is representative of the total distance from that particular optically-perceptible marking to lip 150. For example, an optically-perceptible marking may be representative of seven (7) feet, six and ninety-nine hundredths (6.99) of a foot, six and ninety-eight hundredths (6.98) of a foot, three and fifty-two hundredths (3.52) of a foot, two hundredths (0.02) of a foot, etc. Each optically-perceptible marking of encoded strip 212 also represents height information that is “incremental” in the sense that each optically-perceptible marking represents a distance to an adjacent optically-perceptible marking.

In one embodiment, encoded strip 212 includes seven hundred (700) optically-perceptible markings, where each optically-perceptible marking represents one one-hundredth (1/100) of a foot, and where electronic control unit 210*a* calculates a height measurement based on a previous (or default) height measurement and the number of optically-perceptible markings displaced during the movement of height-adjustable rod 110 with respect to tubular housing 120.

Direct reading prism pole 200*a* also includes an electronic display 220 and, optionally, an audio device, each in electrical communication with electronic control unit 210*a*. Electronic display 220 preferably receives height reference data from electronic control unit 210*a* and displays the height reference data on a screen in a pre-programmed or user-selected format. Electronic display 220 mounts to the outer surface of tubular housing 120 at any suitable location; desirably it is mounted on the unnumbered flange at the upper end of tubular housing 120.

An optional audio device 222 preferably emits an alarm in response to receipt of a signal from electronic control unit 210*a* indicating movement of height-adjustable rod 110 with respect to tubular housing 120. In this respect, audio device 222 aids in alerting the operator when a change in height has occurred. Audio device 222 mounts to the outer surface of tubular housing 120 at any suitable location; one suitable location is depicted in FIG. 2*a*. Audio device 222 may be integrated with electronic display 220 as a component thereof or may be a standalone device, as shown in FIG. 2*a*, to alert the operator. The operator using direct reading prism pole 200*a* may suppress the audio alarm by pressing a key on electronic display 220.

Direct reading prism pole 200*a* also includes an output device shown and designated as 230. Electronic display 220 may be an integral part of output device 230, as illustrated in FIG. 2*a*. Output device 230 is in electrical communication with electronic control unit 210*a* and preferably includes an output jack for wire transmission, or a wireless transmitter, for sending height reference data from electronic control unit 210*a* to a data collection device (not shown). Although an operator of direct reading prism pole 200*a* may read height reference data directly from electronic display 220 in order to manually enter the height reference data into a log book or data collection device, output device 230 preferably communicates height reference data directly from electronic control unit 210*a* to a data collection device, such as an electronic field device for storing survey-related information. The data collection device may be located well away from the prism pole and may include or be connected to a further remote computer system that may be adapted to wirelessly receive, store, and analyze height reference survey data.

In lieu of optically-perceptible markings and an optical reader, magnetic markings, optically encoded markings such as bar codes, or mechanical markings may be used with appropriate corresponding readers.

Figure 2B:
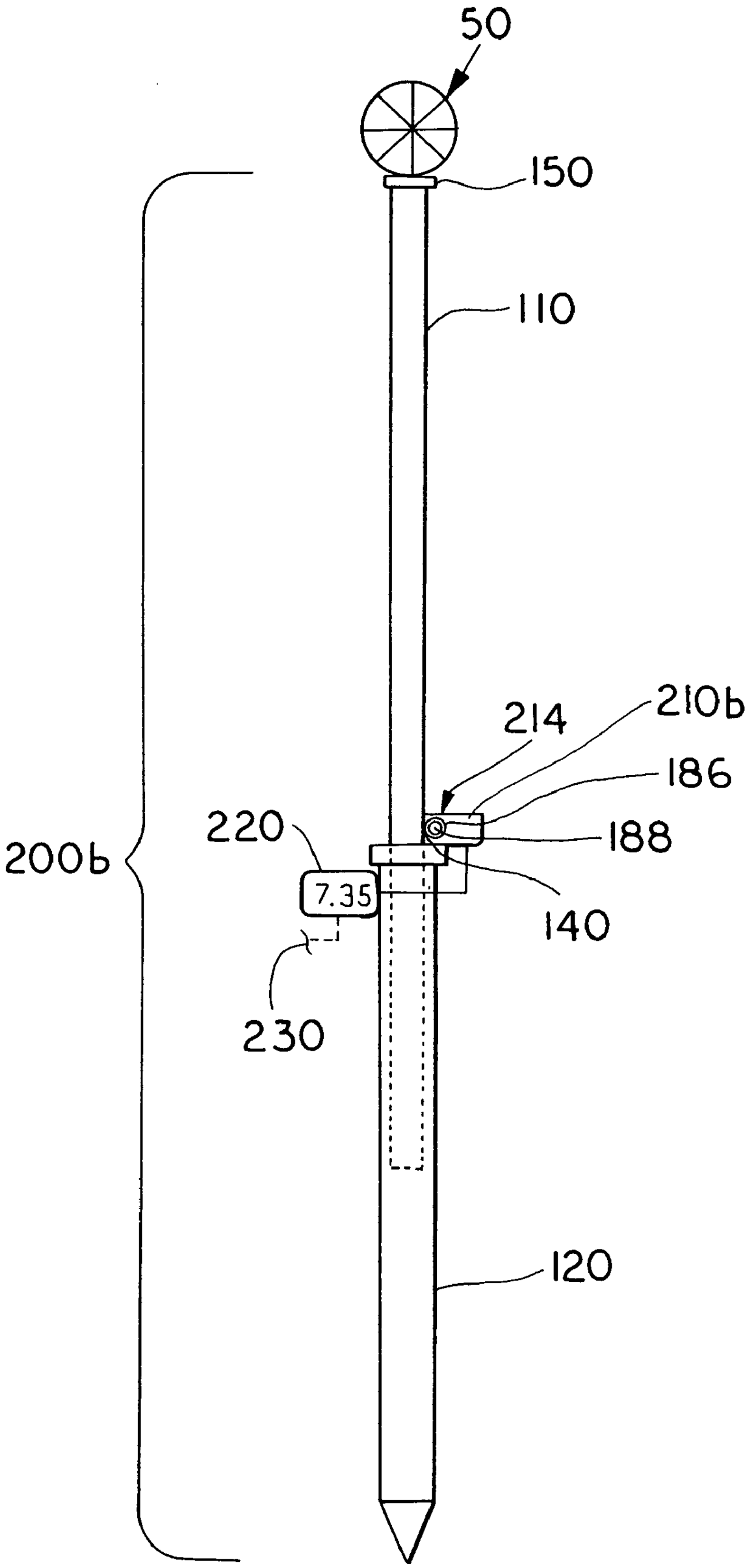
FIG. 2*b* is a front elevation in accordance with the invention of a reflective prism and a direct reading prism pole having an electronic control unit with a wheel assembly.

Referring to FIG. 2*b*, a second embodiment of a direct reading prism pole in accordance with the invention is designated generally 200*b*. Direct reading prism pole 200*b* includes an electronic control unit 210*b* for automatically taking height measurements and providing corresponding height reference data in the same form as electronic control unit 210*a* described above. Electronic control unit 210*b* includes a wheel assembly 214 having a wheel 186 and a central axis 188. Electronic control unit 210*b* mounts to the flange defining the upper end of tubular housing 120 so wheel 186 is positioned near reading point 140.

Wheel 186 of wheel assembly 214 is positioned for a friction fit with height-adjustable rod 110. The friction fit causes wheel 186 of wheel assembly 214 to rotate about central axis 188 when height-adjustable rod 110 moves with respect to tubular housing 120. Because the radius of wheel 186 is constant, electronic control unit 210*b* may calculate a height measurement by using a previous (or default) height measurement and a change in height corresponding to an angular displacement of wheel 186.

Electronic control unit 210*b* stores the computed height measurements. Electronic control unit 210*b* is also programmed with a default initial height measurement associated with a fully extended position of height-adjustable rod 110. For example, if height-adjustable rod 110 is fully extended prior to use and the total distance between reading point 140 and lip 150 is seven (7) feet, then the default initial height measurement would be seven (7) feet. Electronic control unit 210*b* desirably also includes manually-operable controls, not illustrated in the drawings, for setting or adjusting the default initial height measurement.

Electronic control unit 210*b* is preferably in electrical communication with electronic display 220, which is desirably an integral part of output device 230, and is preferably in electrical communication with audio device 222, in a manner similar to that described above with respect to electronic control unit 210*a*. For brevity, the FIG. 2*a* disclosure made above with regard to electronic display 220, output device 230, and audio device 222 is incorporated by reference as respecting FIG. 2*b*.

Figure 2C:
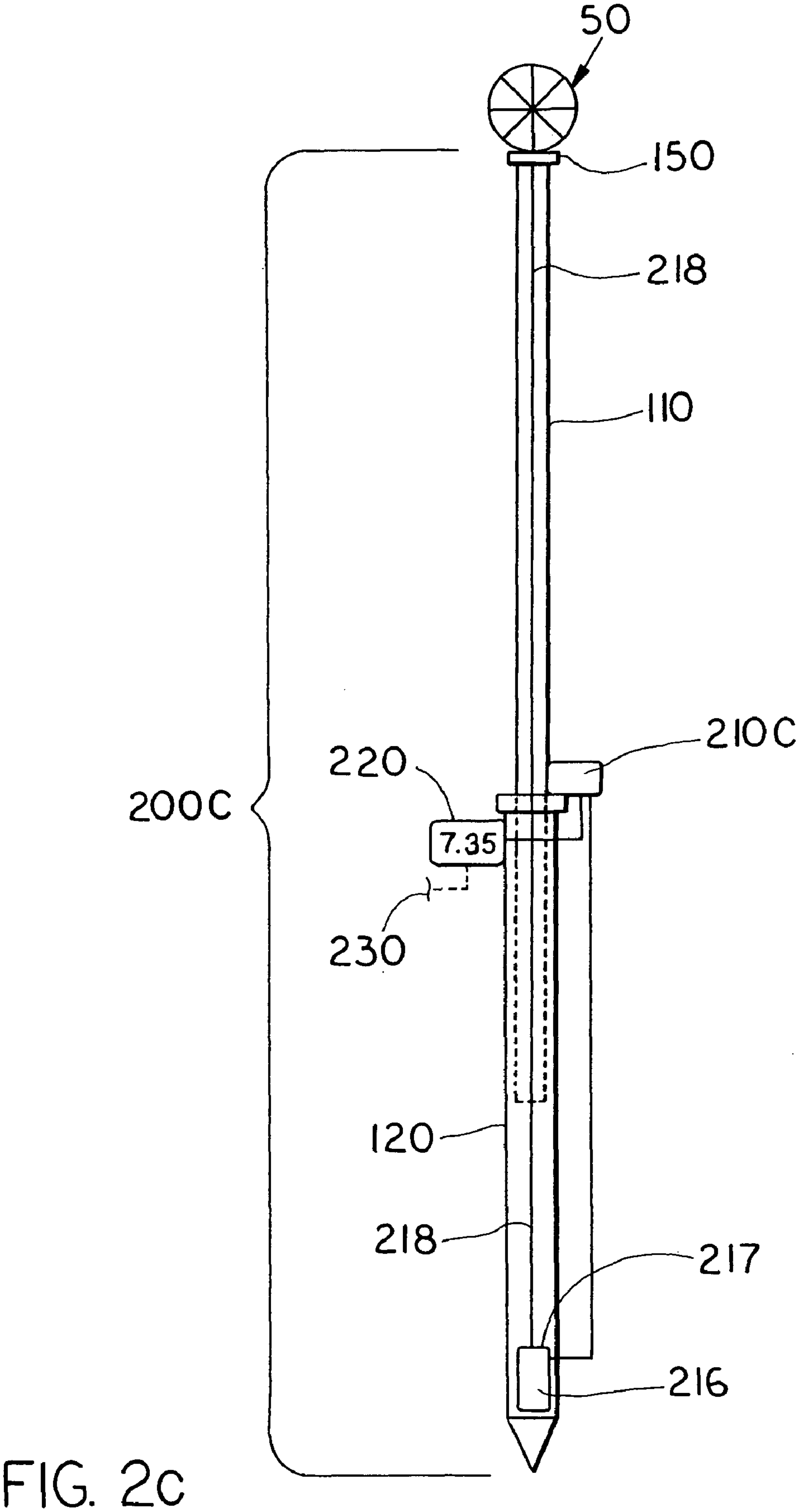
FIG. 2*c* is a front elevation in accordance with the invention of a reflective prism and a direct reading prism pole having an electronic control unit in combination with a laser sensor.

Referring to FIG. 2*c*, a third embodiment of a direct reading prism pole in accordance with the invention is designated generally 200*c*. Direct reading prism pole 200*c* includes an electronic control unit 210*c* in electrical communication with a laser beam emitting and laser sensing unit 216 for automatically obtaining height measurements and providing corresponding height reference data. Electronic control unit 210*c* may be mounted at any suitable location on direct reading prism pole 200*c*. Laser beam emitting and laser sensing unit 216 desirably mounts on the outer surface of tubular housing 120 with the laser-emitting side 217 of unit 216 pointing directly toward lip 150. The laser-emitting side 217 of sensor 216 is perpendicular to the common longitudinal axis of height-adjustable rod 110 and tubular housing 120.

When actuated, laser beam emitting and sensing unit 216 emits a laser beam 218 towards lip 150 to measure the distance between lip 150 and laser beam emitting and sensing unit 216. Laser beam 218 travels toward lip 150, parallel to height-adjustable rod 110, and perpendicular to lip 150. Laser beam emitting and sensing unit 216 measures distance between unit 216 and lip 150 by knowing the velocity of laser beam 218 and measuring the time for laser beam 218 to travel from laser beam emitting and sensing unit 216 to lip 150 with the laser sensing portion of unit 216 either detecting the return of the laser beam after impinging on and being reflected by lip 150 (if lip 150 is configured to reflect the laser beam along the same line of travel to unit 216) or by detecting scattering of the laser beam upon beam impingement on lip 150 (if the sensor of unit 216 is configured to detect scattered laser light upon the laser beam infringing on lip 150 and lip 150 is configured to scatter the laser beam rather than reflect it). Electronic control unit 210*c* is preferably programmed with the default initial distance between laser emitting and sensor unit 216 and lip 150 when height-adjustable rod 110 is in a fully extended position. Electronic control unit 210*c* preferably calculates a height measurement by using the distance calculated from the data forwarded by laser beam emitting and sensing unit 216 to lip 150 and the initial default distance from laser beam emitting and sensing unit 216 to lip 150.

Electronic control unit 210*c* is in electrical communication with electronic display 220, output device 230, and audio device 222 in a manner similar to that described above with respect to electronic control unit 210*a*. For brevity, the disclosure made above with regards to electronic display 220, output device 230, and audio device 222 as respecting FIGS. 2*a* and 2*b* is incorporated by reference with respect to FIG. 2*c*.

Figure 2D:
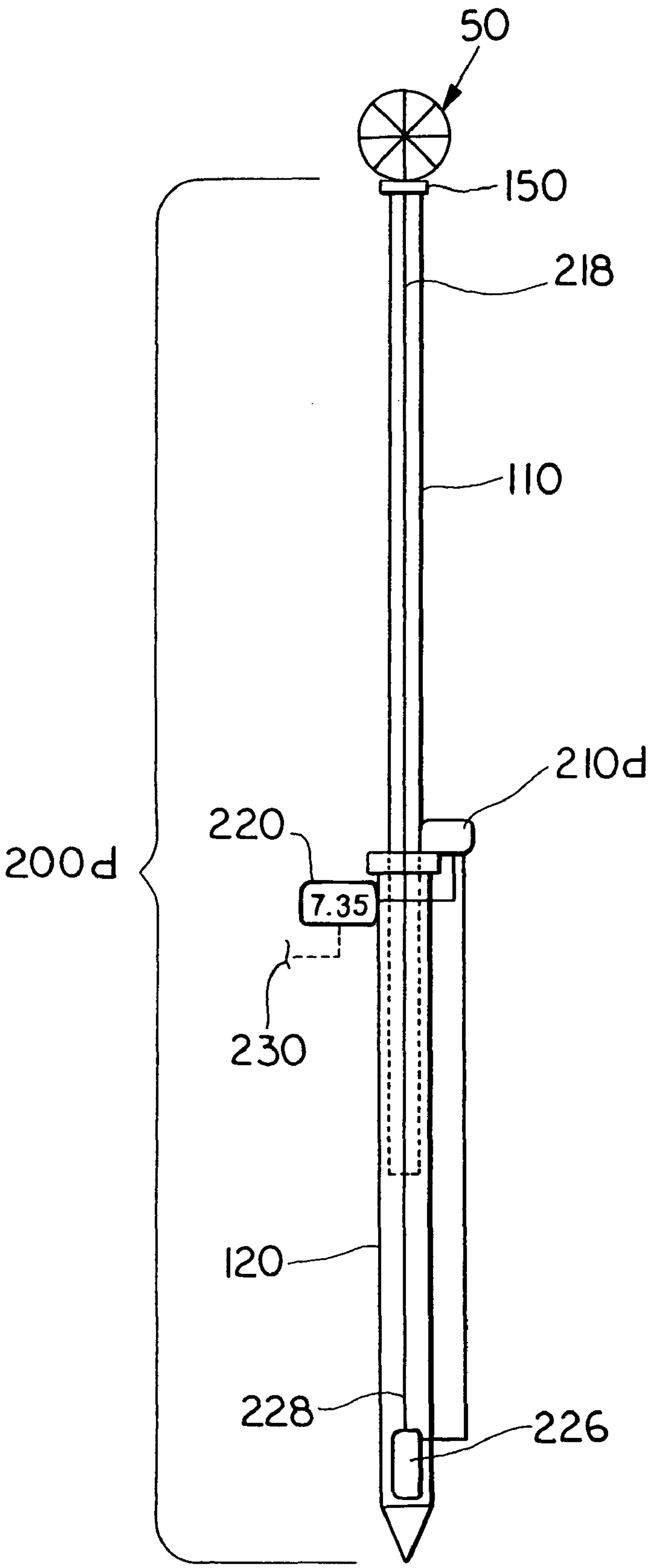
FIG. 2*d* is a front elevation in accordance with the invention of a reflective prism and a direct reading prism pole having an electronic control unit in combination with a string potentiometer.

Referring to FIG. 2*d*, a fourth embodiment of a direct reading prism pole in accordance with the invention is designated generally 200*d*. Direct reading prism pole 200*d* includes an electronic control unit 210*d* in electrical communication with a string potentiometer sensor 226 for automatically obtaining height measurements and providing corresponding height reference data. Electronic control unit 210*d* mounts to any suitable location on direct reading prism 200*d*. String potentiometer 226 mounts to the outer surface of tubular housing 120 with the string measurement side of string potentiometer 226 pointing directly toward lip 150. The string measurement side of string potentiometer 226 is perpendicular to the common longitudinal axis of height-adjustable rod 110 and tubular housing 120.

String potentiometer 226 is actuated by extending 'string' or wire 228 in the direction of lip 150 to measure the distance between lip 150 and string potentiometer 226. String 228 preferably is externally attached to lip 150, parallel to height-adjustable rod 110, and perpendicular to lip 150. String 228 measures distance between string potentiometer 226 and lip 150 by calibrating string 228 to a known length with the string potentiometer 226 generating indexed electronic data, relating to the angular displacement of a spool (not shown) on which the string is stored within string potentiometer 226, which data is furnished to control unit 210*d*. The data is generated as the string is pulled off the storage spool and the spool turns in response.

Electronic control unit 210*d* is preferably programmed with the default initial distance between string potentiometer 226 and lip 150 when height-adjustable rod 110 is in a fully extended position. Electronic control unit 210*d* preferably calculates a height measurement by using the measurement data from string potentiometer 226 to lip 150 and the initial default distance. Electronic control unit 210*d* is in electrical communication with electronic display 220, output device 230, and audio device 222 in a manner similar to that described above with respect to electronic control unit 210*c*. For brevity, the disclosure made above with regard to electronic display 220, output device 230, and audio device 222, as respecting FIGS. 2*a*, 2*b* and 2*c*, is incorporated by reference respecting FIG. 2*d*.

The following is claimed:

1. A direct reading prism pole for automatically taking height measurements and providing corresponding height reference data, comprising:

a) a tubular housing having an open top, a flange positioned at the open top, and a bottom portion for contacting ground soil;
b) a height-adjustable rod insertable into the housing, having an outer diameter less than inner diameter of the housing to provide a friction fit therebetween for adjustably fixedly positioning the height-adjustable rod relative to the housing;
c) a series of spaced apart optically-perceptible markings extending longitudinally on the rod exterior;
d) an electronic control unit including an optical reader and being mounted on the housing at the open top thereof to define a reading point for obtaining height data from the markings and processing the height data into height reference data and including an electronic display displaying the height reference data on a screen;
e) an audio device in electrical communication with the electronic control unit for emitting an audible alarm in response to receipt of a signal from the electronic control unit indicating movement of the height-adjustable rod with respect to the tubular housing; and
f) an output device in electrical communication with the electronic control unit for sending the height reference data to a remote data collection device.

2. A direct reading prism pole for automatically taking height measurements and providing corresponding height reference data, comprising:

a) a tubular housing having an open top, a flange positioned at the open top, and a bottom portion for supporting the housing on ground soil;
b) a height-adjustable rod insertable into the housing, having an outer diameter less than inner diameter of the housing to provide a friction fit therebetween for adjustably fixedly positioning the height-adjustable rod relative to the housing;
c) an electronic control unit including a wheel assembly having a wheel rotatable about an axis, the wheel being in a frictioned contact with the height-adjustable rod and rotating about the axis in response to telescoping movement of the height-adjustable rod relative to the housing, for calculating a height measurement from an angular displacement of the wheel and converting the height measurement into height reference data and including an electronic display for displaying the height reference data on a screen;
d) an audio device in electrical communication with the electronic control unit for emitting an alarm in response to receipt of a signal from the electronic control unit indicating movement of the height-adjustable rod with respect to the tubular housing; and
e) an output device in electrical communication with the electronic control unit for sending the height reference data to a data collection device.

3. A direct reading prism pole for automatically taking height measurements and providing corresponding height reference data, comprising:

a) a tubular housing having an open top, a flange positioned at the open top, and a bottom portion for supporting the housing on ground soil;
b) a height-adjustable rod telescopically insertable into the tubular housing and having an outer diameter sufficiently less than inner diameter of the housing to provide a friction fit therebetween for adjustably fixedly positioning the height-adjustable rod relative to the housing;
c) a lip at the top end of height-adjustable rod that does not telescope into the housing;
d) a laser beam sensing unit mounted to the tubular housing for emitting a laser beam toward the lip to generate measurement data indicative of the distance between the laser sensor and the lip, the laser beam being parallel to the height-adjustable rod and perpendicular to the lip, the laser sensing unit having a detecting portion for sensing reflection of the emitted laser beam by the lip back towards the unit;
e) an electronic control unit in electrical communication with the laser beam emitting and laser sensing unit for receiving the measurement data and providing height reference data corresponding to the measurement data;
f) an electronic display in electrical communication with the electronic control unit for receiving the height reference data and displaying the height reference data on a screen;
g) an audio device in electrical communication with the electronic control unit for emitting an alarm in response to receipt of a signal from the electronic control unit indicating movement of the height-adjustable rod with respect to the tubular housing; and
h) an output device in electrical communication with the electronic control unit for sending the height reference data to a data collection device.

4. The direct reading prism pole of claim 3 wherein the laser beam sensing unit is mounted on an outer surface of the tubular housing.

5. A direct reading prism pole for taking height measurements and providing corresponding height reference data, comprising:

a) a tubular housing having an open top and a bottom portion for supporting the housing on ground soil;
b) an adjustable rod telescopically insertable into the housing, having outer diameter sufficiently less than inner diameter of the housing to provide slidable friction fit therebetween for adjustably fixedly positioning the rod relative to the housing including a reflector at the end of the rod that does not telescope into the housing;
c) a sensing unit connected to the housing for emitting a laser toward the reflector to generate data indicative of the distance between the sensing unit and the lip, the emitted laser beam being parallel to the rod and perpendicular to the reflector, the sensing unit having a detecting portion for sensing reflection of the laser by the reflector back towards the sensing unit; and d) an electronic control unit in electrical communication with the sensing unit for receiving the measured data and providing height reference information corresponding to the measured data period.

6. The prism pole of claim 5 further comprising an electronic display in electrical communication with the electronic control unit for receiving the height reference data and displaying the height reference data on a screen.

7. The prism pole of claim 6 further comprising:

a) an audio device in electrical communication with the electronic control unit for emitting an alarm in response to receipt of a signal from the electronic control unit indicating movement of the height-adjustable rod with respect to the tubular housing; and b) an output device in electrical communication with the electronic control unit for sending the height reference data to a data collection device.

8. The prism pole of claim 6 wherein the electronic display is an integral portion of the electronic control unit.

9. The prism pole of claim 5 further comprising an audio device in electrical communication with the electronic control unit for emitting an alarm in response to receipt of a signal from the electronic control unit indicating movement of the height-adjustable rod with respect to the tubular housing.

10. The prism pole of claim 5 further comprising an output device in electrical communication with the electronic control unit for sending the height reference data to a data collection device.

11. A direct reading prism pole for measuring height and providing corresponding height reference data, comprising:

a) a tubular housing having an open top, and a bottom portion for supporting the housing on ground soil;

b) an adjustable rod telescopically insertable into the housing, having outer diameter sufficiently less than inner diameter of the housing to provide slidable friction fit therebetween for adjustably fixedly positioning the rod relative to the housing including means, mounted at the end of the rod that does not telescope into the housing for retaining string when inserted thereinto;

c) a string potentiometer mounted to the tubular housing for generate measurement data indicative of the distance between the string potentiometer and the string retaining means upon string being pulled from the potentiometer and inserted into the retaining means lip, along a line parallel with the height-adjustable rod;

d) an electronic control unit in electrical communication with the string potentiometer for receiving the measurement data and providing height reference data corresponding to the measurement data.

12. The prism pole of claim 11 wherein the electronic control unit displays the height reference data on a screen.

13. The prism pole of claim 11 further comprising an audio device in electrical communication with the electronic control unit for emitting an alarm in response to receipt of a signal from the electronic control unit indicating movement of the height-adjustable rod with respect to the tubular housing.

14. The prism pole of claim 11 further comprising an output device in electrical communication with the electronic control unit for sending the height reference data to a data collection device.

15. A direct reading prism pole for automatically taking height measurements and providing corresponding height reference data, comprising:

a) a tubular housing having an open top and a bottom portion for supportingly contacting ground soil;

b) a height-adjustable rod telescopingly insertable into the housing, having outer diameter less than inner diameter of the housing to provide a friction fit therebetween for adjustably fixedly positioning the rod relative to the housing and including a series of spaced apart distance indicating indicia extending longitudinally on the rod exterior;

c) an electronic control unit including an sensor for said indicia, being mounted on the housing at the open top thereof to define a reading point for obtaining height data from the indicia and processing the height data into height reference data.

16. The prism pole of claim 15 wherein the indicia are magnetic.

17. The prism pole of claim 15 wherein the indicia are optically encoded.

18. The prism pole of claim 15 wherein the indicia are mechanically detectable.

19. A direct reading prism pole for taking height measurements and providing corresponding height reference data, comprising:

a) a tubular housing having an open top and a bottom portion for supporting the housing on ground soil;

b) an adjustable rod telescopically insertable into the housing, having outer diameter sufficiently less than inner diameter of the housing to provide slidable friction fit therebetween for adjustably fixedly positioning the rod relative to the housing including a light diffuser at the end of the rod that does not telescope into the housing;

c) a sensing unit connected to the housing for emitting a laser toward the diffuser to generate data indicative of the distance between the sensing unit and the light diffuser, the emitted laser beam being parallel to the rod, the sensing unit having a detecting portion for sensing scattering of the laser by the diffuser; and d) an electronic control unit in electrical communication with the sensing unit for receiving the measured data and providing height reference information corresponding to the measured data period.

20. The prism pole of claim 19 further comprising an output device in electrical communication with the electronic control unit for sending the height reference data to a data collection device.

* * * * *